United States Patent
Kurashina et al.

(10) Patent No.: US 9,539,547 B2
(45) Date of Patent: Jan. 10, 2017

(54) POROUS FILM MANUFACTURING METHOD AND APPARATUS

(75) Inventors: Masaki Kurashina, Otake (JP); Toshinori Sumi, Otake (JP); Yasuo Hiromoto, Otake (JP); Hiroyuki Fujiki, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 97 days.

(21) Appl. No.: 14/236,287

(22) PCT Filed: Aug. 3, 2012

(86) PCT No.: PCT/JP2012/069878
§ 371 (c)(1),
(2), (4) Date: Feb. 6, 2014

(87) PCT Pub. No.: WO2013/018900
PCT Pub. Date: Feb. 7, 2013

(65) Prior Publication Data
US 2014/0163124 A1 Jun. 12, 2014

(30) Foreign Application Priority Data
Aug. 3, 2011 (JP) .................................. 2011-170064

(51) Int. Cl.
*C08J 9/00* (2006.01)
*B01D 67/00* (2006.01)
*B01D 71/34* (2006.01)
*B01D 71/44* (2006.01)
*B01D 69/08* (2006.01)

(52) U.S. Cl.
CPC ......... *B01D 67/003* (2013.01); *B01D 67/0009* (2013.01); *B01D 67/0016* (2013.01); *B01D 67/0083* (2013.01); *B01D 67/0093* (2013.01); *B01D 67/0095* (2013.01); *B01D 69/08* (2013.01); *B01D 71/34* (2013.01); *B01D 71/44* (2013.01); *C08J 9/0066* (2013.01); *B01D 2323/08* (2013.01); *B01D 2323/42* (2013.01); *B01D 2325/40* (2013.01); *B01D 2325/42* (2013.01)

(58) Field of Classification Search
CPC ............ B01D 67/0009; B01D 67/0083; B01D 67/0093; B01D 67/0095; B01D 71/34; B01D 71/44; B01D 2325/40; B01D 2325/42; B01D 67/0016; B01D 67/003; B01D 69/08; B01D 2323/08; B01D 2323/42; C08J 9/0066
See application file for complete search history.

(56) References Cited

U.S. PATENT DOCUMENTS

| 2,967,120 | A | 1/1961 | Chaney |
| 4,332,752 | A | 6/1982 | Henne et al. |
| 4,338,282 | A | 7/1982 | Motooka et al. |
| 5,076,925 | A | 12/1991 | Roesink et al. |
| 5,891,370 | A | 4/1999 | Connor et al. |
| 6,156,381 | A | 12/2000 | Leong et al. |
| 2002/0092547 | A1 | 7/2002 | You et al. |
| 2009/0260979 | A1 | 10/2009 | Saitou |
| 2009/0283469 | A1 | 11/2009 | Ariji et al. |
| 2011/0064929 | A1* | 3/2011 | Rhee ............... H01M 2/166 428/213 |
| 2014/0343178 | A1 | 11/2014 | Mizokoshi et al. |

FOREIGN PATENT DOCUMENTS

| JP | 55-49109 | 4/1980 |
| JP | 61 146301 | 7/1986 |
| JP | 63 20339 | 1/1988 |
| JP | 2 47141 | 2/1990 |
| JP | 09-057078 | 3/1997 |
| JP | 10 511144 | 10/1998 |
| JP | 11 80414 | 3/1999 |
| JP | 3196029 | 8/2001 |
| JP | 2002 119833 | 4/2002 |
| JP | 2003 81625 | 3/2003 |
| JP | 2004-033854 | * 2/2004 |
| JP | 2005 42074 | 2/2005 |
| JP | 2005 220202 | 8/2005 |
| JP | 2008 161755 | 7/2008 |
| JP | 2008 207050 | 9/2008 |
| JP | 2008-237987 | 10/2008 |
| JP | 2010-149044 | 7/2010 |

(Continued)

OTHER PUBLICATIONS

Notice of Allowance issued Aug. 19, 2014 in Japanese Patent Application No. 2012-539101 (with English language translation).

(Continued)

Primary Examiner — Irina S Zemel
(74) Attorney, Agent, or Firm — Oblon, McClelland, Maier & Neustadt, L.L.P.

(57) ABSTRACT

A method of manufacturing a porous film includes a decomposition step of introducing a porous film precursor which is formed by coagulating an undiluted film forming solution containing a hydrophilic polymer and a hydrophobic polymer, into a decomposition container; bringing a heated chemical containing an oxidizing agent into contact with the porous film precursor in the decomposition container; warming the porous film precursor in contact with the chemical; and decomposing the hydrophilic polymer remaining inside the porous film precursor using the oxidizing agent. An apparatus for manufacturing a porous film includes a decomposition device provided with the decomposition container.

8 Claims, 3 Drawing Sheets

(56) References Cited

FOREIGN PATENT DOCUMENTS

| JP | 2011 200799 | 10/2011 |
|---|---|---|
| JP | 2012-229380 A | 11/2012 |
| WO | WO 2005/009580 A2 | 2/2005 |
| WO | WO 2005/009580 A3 | 2/2005 |

OTHER PUBLICATIONS

International Search Report Issued Dec. 4, 2012 in PCT/JP12/073699 Filed Sep. 14, 2012.
Extended European Search Report issued Jul. 4, 2014 in Patent Application No. 12744275.4.
International Search Report Issued May 1, 2012 in PCT/JP12/052740 filed Feb. 7, 2012.
International Search Report Issued Oct. 16, 2012 in PCT/JP12/069878 Filed Aug. 3, 2012.
Office Action issued Jan. 5, 2016 in Japanese Patent Application No. 2012-511855 (w/English translation).
Office Action mailed Feb. 5, 2016 in co-pending U.S. Appl. No. 13/983,705.
Office Action issued Mar. 29, 2016 in Japanese Patent Application No. 2012-51185 (w/English translation).
Office Action mailed May 3, 2016 in co-pending U.S. Appl. No. 14/344,469.

\* cited by examiner

POROUS FILM MANUFACTURING METHOD AND APPARATUS

TECHNICAL FIELD

The present invention relates to a method of manufacturing a porous film such as a hollow fiber film and an apparatus for manufacturing thereof.

Priority is claimed on Japanese Patent Application No. 2011-170064, filed Aug. 3, 2011, the content of which is incorporated herein by reference.

BACKGROUND ART

In concentration and collection of useful components, removal of unwanted components, fresh water generation and the like in fields of food industry field, medical field, electronic industry field and the like, a porous hollow fiber film which is made of cellulose acetate, polyacrylonitrile, polysulfone, fluorine-based resin and the like and is manufactured by a wet spinning method or a dry-wet spinning method, for example, is often used for a microfiltration film, ultrafiltration film, reverse osmosis filtration film and the like.

In a case of manufacturing the hollow fiber film by the wet spinning method or the dry-wet spinning method, an undiluted film forming solution containing a hydrophobic polymer and a hydrophilic polymer is prepared first. Subsequently, a coagulated substance, that is, a hollow fiber film precursor is formed through a film forming step of discharging this undiluted film forming solution in an annular shape and coagulating the same in a coagulated liquid. The undiluted film forming solution may be either introduced into the coagulated liquid via an air-contact traveling portion (dry-wet spinning method) or introduced directly into the coagulated liquid (wet spinning method).

Here, generally, in the film of the hollow fiber film precursor after the film forming step, the hydrophilic polymer remains a state of solution. If the hydrophilic polymer remains in the film in this manner, it is difficult for the hollow fiber film to exhibit high water permeability (water permeability in film).

Therefore, PTL 1 discloses that a hollow fiber film precursor after a film forming step is dipped into a low-temperature chemical containing an oxidizing agent such as sodium hypochlorite, and after causing the hollow fiber film precursor to maintain the chemical at a low temperature, the hollow fiber film precursor holding the chemical is heated in a gas phase, thereby decomposing the hydrophilic polymer remaining in the hollow fiber film precursor. After heating in the gas phase, a washing step of washing the hydrophilic polymer and a decomposition products thereof is performed.

CITATION LIST

Patent Literature

[PTL 1] Japanese Unexamined Patent Application, First Publication No. 2005-220202

SUMMARY OF INVENTION

Technical Problem

However, in order to sufficiently decompose a hydrophilic polymer remaining in a hollow fiber film precursor after a film forming step according to a technology disclosed in PTL 1, it is necessary to repeat a cycle of a dipping step of a chemical at low temperature, a heat decomposition step in a gas phase and a washing step thereafter for a plurality of times, thereby requiring a long time.

In this manner, in the related art, a technology capable of decomposing the hydrophilic polymer remaining in a porous film precursor such as the hollow fiber film precursor in a short time has not been found.

The present invention has been made in consideration of the above-described problem, and aims to provide a method of manufacturing a porous film and an apparatus for manufacturing thereof in which the hydrophilic polymer remaining in the porous film precursor after the film forming step can be decomposed in a short time.

Solution to Problem

As a result of intensive studies, the inventor has been conceived that infiltration of a chemical with respect to a porous film precursor and decomposition of a hydrophilic polymer remaining in the porous film precursor using an oxidizing agent contained in the chemical can proceed at approximately the same time by employing a heated high-temperature chemical as the chemical containing an oxidizing agent and bringing this heated chemical into contact with the porous film precursor in which the hydrophilic polymer remains after a film forming step, thereby enabling the hydrophilic polymer to be decomposed from the porous film precursor after the film forming step in a short time, as a result.

[1] A method of manufacturing a porous film includes a decomposition step of introducing a porous film precursor which is formed by coagulating an undiluted film forming solution containing a hydrophilic polymer and a hydrophobic polymer, into a decomposition container; bringing a heated chemical containing an oxidizing agent into contact with the porous film precursor in the decomposition container; warming the porous film precursor in contact with the chemical; and decomposing the hydrophilic polymer remaining inside the porous film precursor using the oxidizing agent.

[2] In the method of manufacturing a porous film according to [1], the porous film precursor to be in contact with the chemical is heated in advance.

[3] In the method of manufacturing a porous film according to [1] or [2], during the decomposition step, bringing the chemical into contact with the porous film precursor in the decomposition container and warming the porous film precursor after contact with the chemical are individually performed for a plurality of times.

[4] In the method of manufacturing a porous film according to [3], the chemical is an aqueous solution containing sodium hypochlorite as the oxidizing agent, and when bringing the chemical into contact with the porous film precursor for the plurality of times, concentration of the sodium hypochlorite in the chemical for the first contact is from 2,000 mg/L to 120,000 mg/L.

[5] In the method of manufacturing a porous film according to any one of [1] to [4], a temperature is 60° C. or higher and relative humidity is 90% or higher inside the decomposition container.

[6] In the method of manufacturing a porous film according to any one of [1] to [5], vapor is supplied to the decomposition container.

[7] In the method of manufacturing a porous film according to any one of [1] to [6], the chemical is brought into contact with the porous film precursor by introducing the porous film precursor into the chemical.

[8] In the method of manufacturing a porous film according to any one of [1] to [7], the chemical is brought into contact with the porous film precursor by spraying the chemical on the porous film precursor.

[9] An apparatus for manufacturing a porous film includes a decomposition device that decomposes a hydrophilic polymer remaining in a porous film precursor formed by coagulating an undiluted film forming solution containing the hydrophilic polymer and a hydrophobic polymer.

The decomposition device in the apparatus for manufacturing a porous film includes a decomposition container in which a heated chemical containing an oxidizing agent is brought into contact with the porous film precursor, the porous film precursor in contact with the chemical is warmed, and the hydrophilic polymer remaining inside the porous film precursor is decomposed using the oxidizing agent.

[10] In the apparatus for manufacturing a porous film according to [9], the decomposition device further includes heating means of heating an inside of the decomposition container, traveling means of causing the porous film precursor to travel through the decomposition container, and chemical contact means of bringing the chemical into contact with the porous film precursor traveling inside the decomposition container.

[11] In the apparatus for manufacturing a porous film according to [10], the chemical contact means is provided at a plurality of places inside the decomposition container.

[12] In the apparatus for manufacturing a porous film according to [10] or [11], the heating means is vapor supply means of supplying vapor inside the decomposition container.

[13] In the apparatus for manufacturing a porous film according to any one of [10] to [12], the chemical contact means includes a chemical vessel to which the chemical is injected and through which the porous film precursor travels through the chemical.

[14] In the apparatus for manufacturing a porous film according to [13], the chemical vessel is a cascade type in which an inside of the vessel is divided into a plurality of zones, and the chemical overflowed from a zone on an upstream side is sequentially supplied to a zone on a downstream side.

[15] In the apparatus for manufacturing a porous film according to any one of [10] to [14], the chemical contact means includes spraying means of spaying the chemical on the porous film precursor.

[16] In the apparatus for manufacturing a porous film according to any one of [10] to [15], the decomposition container has a heat exchange portion inside thereof in which the chemical is heated by heat exchange with a gas inside the decomposition container.

[17] In the apparatus for manufacturing a porous film according to any one of [10] to [16], the traveling means includes a plurality of traveling rolls and some traveling rolls is a driving roll.

[18] In the apparatus for manufacturing a porous film according to any one of [10] to [17], the traveling means includes the plurality of traveling rolls and a guide bar is attached to at least one of the traveling rolls to prevent the porous film precursor from deviating from the traveling roll.

[19] In the apparatus for manufacturing a porous film according to any one of [10] to [18], the traveling means includes the plurality of traveling rolls and a regulation groove is formed on a surface in at least one of the traveling rolls to regulate the traveling of the porous film precursor.

[20] In the apparatus for manufacturing a porous film according to any one of [9] to [19], an entrance through which the porous film precursor is introduced into the decomposition container and an exit through which the porous film precursor is derived out from the decomposition container are formed in the decomposition container.

At the entrance and the exit, there are respectively provided a water sealing portion which insulates the inside of the decomposition container from the outside air and enable the porous film precursor to be introduced and derived.

[21] In the apparatus for manufacturing a porous film according to [20], the water sealing portion has liquid replacing means of replacing a liquid inside the water sealing portion.

[22] In the apparatus for manufacturing a porous film according to any one of [9] to [21], the decomposition container is formed to have side wall portions and a top portion which closes upper ends of the side wall portions.

The top portion has an apex portion and a slope portion which slopes downward from the apex portion.

Advantageous Effects of Invention

According to the present invention, it is possible to decompose a hydrophilic polymer remaining in a porous film precursor after a film forming step in a short time.

DESCRIPTION OF EMBODIMENTS

A method of manufacturing a porous film according to the present invention includes a film forming step of forming a porous film precursor by coagulating an undiluted film forming solution containing a hydrophilic polymer and a hydrophobic polymer; and a decomposition step of introducing a porous film precursor obtained through the film forming step into a decomposition container, bringing a chemical containing an oxidizing agent into contact with the porous film precursor in the decomposition container, warming the porous film precursor in contact with the chemical, and decomposing the hydrophilic polymer remaining inside the porous film precursor using the oxidizing agent. According to the invention, an actively heated chemical is used as the chemical to be brought into contact with the porous film precursor.

Hereinafter, in the description of the invention a hollow fiber film is exemplified as an example of the porous film. In this specification, a film which completed a washing step after the decomposition step is referred to as the hollow fiber film (porous film), and a film which is in a stage before completing the washing step is referred to as a hollow fiber film precursor (porous film precursor).

[Film Forming Step]

In the film forming step, firstly, the undiluted film forming solution containing the hydrophilic polymer and the hydrophobic polymer is prepared. Subsequently, this undiluted film forming solution is discharged into a coagulated liquid from a nozzle in which an annular discharge port is formed, thereby forming the hollow fiber film precursor through the film forming step of coagulating in the coagulated liquid.

The film forming step may be performed through either a dry-wet spinning method of introducing the coagulated liquid via an air-contact traveling portion in which the undiluted film forming solution comes into contact with the air, or a wet spinning method of directly introducing the coagulated liquid. In addition, the hollow fiber film precursor manufactured herein may be configured, without being particularly limited, for example, to include a porous base material or to have a multilayer structure to be durable with respect to a scratch during handling.

As an example of the porous base material, without being particularly limited, knitted or plaited hollow cords braided with various fibers can be exemplified, and various materials can be used singly or in combination. As the fiber used for the knitted or plaited hollow cords, a synthetic fiber, a semi-synthetic fiber, a regenerated fiber and a natural fiber can be exemplified. In addition, a form of the fiber may be any one of a monofilament, a multifilament and spun yarn.

As the hydrophobic polymer to be used, without being particularly limited as long as the hollow fiber film precursor can be formed by coagulating, a polysulfone-based resin such as polysulfone and polyether sulfone, a fluorine-based resin such as polyvinylidene fluoride, polyacrylonitrile, a cellulose derivative, polyamide, polyester, polymethacrylate, polyacrylate and the like can be exemplified. In addition, a copolymer of these resins may be used, and substituent can be introduced to some of these resins or copolymers to be used. In addition, the same types of polymers of which the molecular weight and the like are different from each other can be blended to be adopted. Two or more different types of resins may be mixed to be used. A copolymer consisting of the fluorine-based resin among those, especially a simple substance such as polyvinylidene fluoride and vinylidene fluoride among the resins and another monomer excels in durability with respect to the oxidizing agent such as hypochlorite. Therefore, when manufacturing the hollow fiber film precursor to be processed using the oxidizing agent in the below-described decomposition step and the like for example, it is suitable to select the fluorine-based resin as the hydrophobic polymer.

The hydrophilic polymer is added to adjust viscosity of the undiluted film forming solution to be in a suitable range for forming the hollow fiber film and to stabilize a film forming state so that polyethylene glycol, polyvinyl pyrrolidone and the like are preferably used. Among these, from the viewpoint of controlling a pore size of the hollow fiber film and the strength of the hollow fiber film, the polyvinyl pyrrolidone or a copolymer in which the polyvinyl pyrrolidone and another monomer are copolymerized is preferable.

In addition, it is possible to mix two or more types of the resins to be used as the hydrophilic polymer. For example, if a substance with a high molecular weight is adopted as the hydrophilic polymer, the hollow fiber film tends to be easily formed in an excellent film structure. Meanwhile, a hydrophilic polymer with a low molecular weight is suitable in that the polymer is more easily removed from the hollow fiber film precursor during a below-described step of removing the hydrophilic polymer. Therefore, the same types of the hydrophilic polymers of which the molecular weight is different from each other may be adopted by being appropriately blended as intended.

It is possible to prepare the undiluted film forming solution by mixing the above-described hydrophobic polymer and hydrophilic polymer into a solvent (good solvent) being soluble therein. Other additive components may be added to the undiluted film forming solution as needed.

There is no particular limitation on the type of solvent. However, when processing a coagulation step by dry-wet spinning, since the pore size of the hollow fiber film is adjusted by absorbing the undiluted film forming solution in the air-contact traveling portion, it is preferable to select a solvent which is easily and uniformly mixed with water. As the solvent thereof, N, N-dimethylformamide; N, N-dimethylacetamide; dimethyl sulfoxide; N-methyl-2-pyrrolidone; N-methylmorpholine-N-oxide and the like can be exemplified, and one or more types among these can be used. In addition, within a range in which solubility of the hydrophobic polymer and the hydrophilic polymer with respect to the solvent is not deteriorated, poor solvents of the hydrophobic polymer and the hydrophilic polymer may be mixed to be used. A temperature of the undiluted film forming solution is generally within a range from 20° C. to 40° C., without being particularly limited.

In both cases where concentration of the hydrophobic polymer in the undiluted film forming solution is overly thick and overly thin, the hollow fiber film tends to be deteriorated in stability during the film forming and difficult to form a suitable hollow fiber film structure thereof. Therefore, it is preferable that the lower limit be 10% by mass, and more preferably be 15% by mass. In addition, it is preferable that the upper limit be 30% by mass, and more preferably be 25% by mass.

Meanwhile, in order to easily form the hollow fiber film precursor, it is preferable that the lower limit for the concentration in the hydrophilic polymer be 1% by mass, and more preferably be 5% by mass. From the viewpoint of operability of the undiluted film forming solution, it is preferable that the upper limit for the concentration in the hydrophilic polymer be 20% by mass, and more preferably be 12% by mass.

Water, alcohol, glycerin, ethylene glycol and the like can be adopted singly or by being mixed as the coagulated liquid. A mixed solution of the water and the hydrophobic polymer with the good solvent may be adopted. A temperature of the coagulated solution is generally within a range from 60° C. to 90° C., without being particularly limited.

[Decomposition Step]

During the decomposition step, a chemical containing an oxidizing agent is brought into contact with a hollow fiber film precursor formed through the film forming step, and a hydrophilic polymer remaining in the hollow fiber film precursor is decomposed by an operation of the oxidizing agent. The decomposition step is performed inside one hermetic decomposition container.

Here, a heated chemical is brought into contact with the hollow fiber film precursor. It is preferable that the chemical which is heated within a range from 30° C. to 120° C. be brought into contact with the hollow fiber film precursor so that the chemical promptly infiltrates the hollow fiber film precursor, and then, the oxidizing agent in the infiltrating chemical affect the hydrophilic polymer in the hollow fiber film precursor without delay. In other words, the infiltration of the chemical with respect to the hollow fiber film precursor and the decomposition of the hydrophilic polymer by the oxidizing agent contained in the chemical can proceed at approximately the same time. As a result, it is possible to decompose the hydrophilic polymer in a short time. It is more preferable that high-temperature vapor such as saturated vapor under the normal pressure (1 atmospheric pressure) be supplied to the decomposition container, and in response thereto, the chemical inside the decomposition container is heated to a range from 60° C. to 100° C.

Regarding the hollow fiber film precursor to be in contact with the chemical, it is also preferable to be heated in advance. It is preferable to be heated in a range from 30° C. to 120° C. Moreover, it is more preferable that the high-temperature vapor such as the saturated vapor under the normal pressure (1 atmospheric pressure) be supplied to the decomposition container, and in response thereto, the hollow fiber film precursor traveling inside the decomposition container is heated in a range from 60° C. to 120° C. In order to be far more preferable, the hollow fiber film precursor is heated to approximately 100° C. In this manner, the hollow fiber film precursor is heated in advance in the decomposition container to be brought into contact with the chemical, thereby further improving an infiltration speed of the chemical within the hollow fiber film precursor.

In addition, in such a case, it is preferable to remove condensate, which is generated on a surface of the hollow fiber film precursor when heating the hollow fiber film precursor in advance, from the surface thereof before the contact with the chemical. Accordingly, it is possible to prevent dilution of the chemical due to the condensate and a hindrance to the chemical infiltration with respect to the film.

After contact with the chemical, it is preferable that the hollow fiber film precursor, after contact with the chemical and being infiltrated by the oxidizing agent, be warmed, thereby maintaining the temperature thereof. In this case, it is preferable to maintain the temperature of the hollow fiber film precursor to be the same as that of the chemical, in particular, to be from 30° C. to 120° C., and it is preferable to maintain the temperature thereof within a range from 60° C. to 100° C. Within this range, it is possible to warm the hollow fiber film precursor, after contact with the chemical, inside the decomposition container by supplying the vapor such as the saturated high-temperature vapor under the normal pressure (1 atmospheric pressure) into the decomposition container. In order to exceed this temperature for warming, for example, there occurs a need to adopt a hot air dryer causing a possibility that a humid state of the hollow fiber film precursor cannot be maintained, or there occurs a need to adopt pressurized steam causing a scale of the apparatus to be large. The hollow fiber film precursor after contact with the chemical is warmed, thereby further improving a decomposition speed of the hydrophilic polymer remaining inside the hollow fiber film precursor.

In addition, particularly at the time of warming, it is preferable to set the temperature inside the decomposition container to be 60° C. or higher and set relative humidity at 90% or higher by supplying vapor. Accordingly, water in the chemical which infiltrates the hollow fiber film precursor is prevented from evaporating. If the water evaporates, the temperature of the hollow fiber film precursor drops, thereby delaying the decomposition speed of the hydrophilic polymer remaining in the hollow fiber film precursor. Therefore, when the relative humidity is maintained as described above, it is possible to prevent the decomposition speed of the hydrophilic polymer remaining in the hollow fiber film precursor from slowing.

Ozone, hydrogen peroxide, permanganate, dichromate, persulfate and the like can be adopted as the oxidizing agent used for the chemical. However, from the viewpoint of being strong in oxidizing power, excellent in decomposition performance, excellent in handling, low in cost, and the like, it is particularly preferable to use hypochlorite. As the hypochlorite, sodium hypochlorite, calcium hypochlorite and the like can be exemplified. However, the sodium hypochlorite is particularly preferable. The chemical can be prepared by dissolving these oxidizing agents into the water.

In addition, in a case of adopting an aqueous solution with the sodium hypochlorite dissolved therein as the chemical, it is preferable that concentration of the sodium hypochlorite in the aqueous solution be from 2,000 mg/L to 120,000 mg/L from the viewpoint of securing an amount necessary for the hydrophilic polymer to be decomposed and suppressing the amount of the sodium hypochlorite used.

As described below, when bringing the chemical into contact with the hollow fiber film precursor for a plurality of times, it is preferable that the chemical used for at least the first contact be from 2,000 mg/L to 120,000 mg/L in concentration of the sodium hypochlorite.

Figure 1:
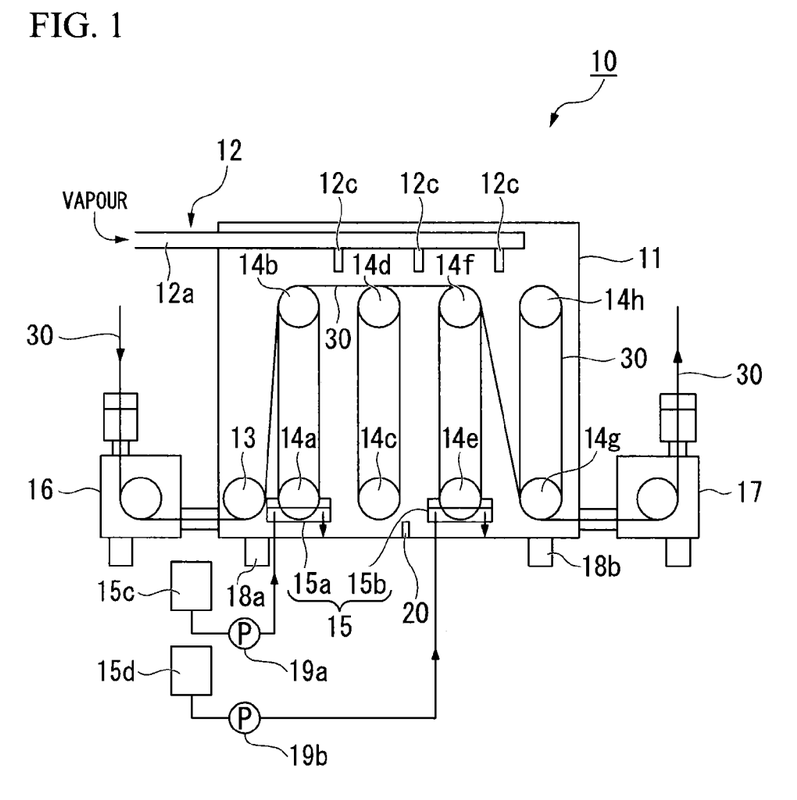
FIG. 1 is a schematic configuration diagram illustrating an example of a decomposition device according to the present invention.

The decomposition step can be performed using a decomposition device 10 in FIG. 1, for example.

The decomposition device 10 in FIG. 1 has a decomposition container 11, vapor supply means 12, as heating means of heating an inside of the decomposition container 11, supplying high-temperature and normal-pressure saturated vapor into the decomposition container 11, an introduction roll 13 and eight traveling rolls 14a to 14h as traveling means of causing a hollow fiber film precursor 30 to travel through the decomposition container 11, and chemical contact means 15 of bringing the chemical into contact with the hollow fiber film precursor 30 traveling inside the decomposition container 11.

The decomposition container 11 is a hermetic container formed with side wall portions, a top portion (ceiling) which closes upper ends of the side walls, and a bottom portion, and there are provided drains 18a and 18b at two places in bottom portion.

In the decomposition container 11, at the entrance through which the hollow fiber film precursor 30 is introduced into the decomposition container 11 and the exit through which the hollow fiber film precursor 30 is derived out from the decomposition container 11, there are provided water sealing portions 16 and 17, respectively, which insulate the inside of the decomposition container 11 from the outside air and enable the hollow fiber film precursor 30 to be introduced and derived, thereby the inside of the decomposition container 11 has hermeticity.

In addition, each of the water sealing portions 16 and 17 in this example individually has a liquid replacement means (not illustrated) for replacing a liquid (water) inside the water sealing portions 16 and 17. Accordingly, the liquids inside the water sealing portions 16 and 17 can be replaced with a new liquid. It is suitable that the replacement be consecutively performed at all times during the decomposition step. However, it may be performed intermittently as needed. Since the hollow fiber film precursor 30 introduced into the water sealing portion 16 at the entrance contains a large amount of hydrophilic polymers that are proceeded from the film forming step, in the liquid inside the water sealing portion 16 at the entrance is gradually concentrated of the hydrophilic polymer in response to the introducing of the hollow fiber film precursor 30. As a result, the hydrophilic polymers in the liquid of the water sealing portion 16 conversely adhere to the hollow fiber film precursor 30 introduced into the decomposition container 11 as passing through the water sealing portion 16. Therefore, it is preferable to provide liquid replacement means in the water sealing portion 16 at the entrance, appropriately replace the liquid inside the water sealing portion 16, and prevent the hydrophilic polymer in the liquid from being concentrated. Meanwhile, decomposition products of the hydrophilic polymer adhere to the hollow fiber film precursor 30 which has finished the decomposition step. Therefore, in the liquid inside the water sealing portion 17 at the exit the decomposition products of the hydrophilic polymer is gradually concentrated in response to the passing of the hollow fiber film precursor 30 which has finished the decomposition step. As a result, the decomposition products of the hydrophilic polymers in the liquid of the water sealing portion 17 adhere to the hollow fiber film precursor 30 derived out from the inside of the decomposition container 11 as passing through the water sealing portion 17, thereby causing a possibility that the hollow fiber film precursor 30 to be forwarded to the next washing step is contaminated. Therefore, it is preferable that the liquid replacement means also be provided in the water sealing portion 17 to appropriately replace the liquid inside the water sealing portion 17, thereby preventing the decomposition products of the hydrophilic polymer from being concentrated with respect to the liquid.

It is preferable that the new liquid to be introduced to the water sealing portions 16 and 17 be new water with no use history. However, for example, the liquid drawn out from the water sealing portions 16 and 17 may be diluted with new water. In addition, the liquid may be in a circulating supply while being diluted with new water with respect to the water sealing portions 16 and 17.

Figure 2:
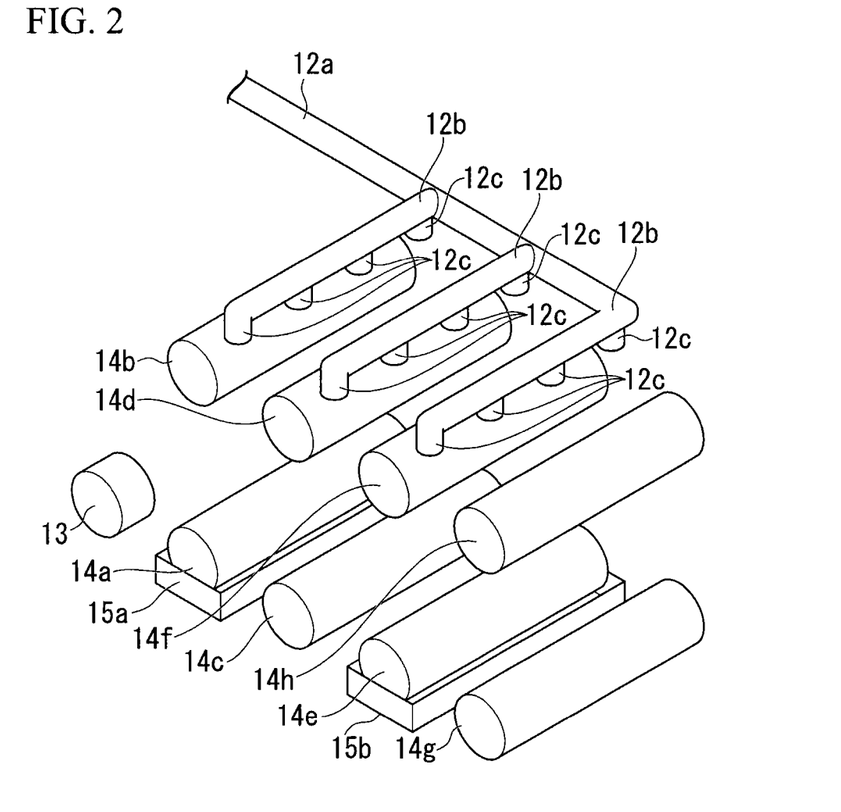
FIG. 2 is a perspective view describing positional relationships among vapor supply means, traveling means and a chemical vessel in the decomposition device in FIG. 1.

The vapor supply means (heating means) 12 is provided with a vapor supply source (not illustrated) disposed outside the decomposition container 11, and a pipe 12a provided in an upper portion inside the decomposition container 11 and through which the high-temperature and normal-pressure saturated vapor from the vapor supply source is introduced into the decomposition container 11. As illustrated in FIG. 2, the pipe 12a branches off in three system of pipes on a downstream side. On a side surface (circumferential surface of pipe) of each branch portion 12b which branches off, a plurality of ejecting nozzle ports 12c which eject the saturated vapor downward are formed in a row along the branch portions 12b along a longitudinal direction. The vapor supply means is not limited to this example as long as it is in a form capable of supplying the vapor into the decomposition container 11.

The traveling means is configured to have the introduction roll 13 which is arranged on an uppermost upstream side in a traveling passage of the hollow fiber film precursor 30 inside the decomposition container 11 and introduces the hollow fiber film precursor 30 into the decomposition container 11, and a plurality of traveling rolls 14a to 14h which cause the introduced hollow fiber film precursor 30 to travel toward a downstream side. The traveling rolls 14a to 14h in this example are configured to have four pairs of rolls in total consisting of upper rolls and lower rolls. In addition, the traveling rolls 14a to 14h are formed to be greater than the introduction roll 13 in length in an axial direction. Accordingly, the hollow fiber film precursor 30 introduced by the introduction roll 13 is set to be able to travel while being wound for a plurality of times from a front side in the drawing to a rear side (that is, from upstream side to downstream side) of the traveling rolls 14a to 14h, and the details will be described below.

Among these traveling rolls 14a to 14h, the lower roll 14a of the first pair of the rolls from the upstream side and the lower roll 14e of the third pair of the rolls are drive rolls provided with a drive mechanism, and other traveling rolls other than the drive rolls are free rolls provided with no drive mechanism. Hereinafter, a pair of rolls in the n-th place from the upstream side is referred to as the n-th pair of the rolls.

In this manner, if some of the traveling rolls 14a to 14h are the drive rolls, it is possible to prevent a film of the hollow fiber film precursor 30 from being collapsed.

In other words, if all the traveling rolls are the free rolls, rotational resistance of the free rolls is applied to the hollow fiber film precursor based on the number of the free rolls, thereby leading to an increase in film-tension of the hollow fiber film precursor. Meanwhile, if some thereof are the drive rolls, in that drive rolls, the film-tension applied to the hollow fiber film precursor due to the rotational resistance of the free rolls on the further upstream side than the drive roll can be relieved. Accordingly, it is possible to prevent the collapse of the film of the hollow fiber film precursor caused by the film-tension.

As illustrated in FIG. 2, the traveling rolls 14a to 14h are arranged in parallel with each other. Then, each of branch portions 12b of the vapor supply means 12 is arranged to be parallel with each of the traveling rolls 14a to 14h thereabove between each of the rolls such as between the first pair of the rolls and the second pair of the rolls, between the second pair of the rolls and the third pair of the rolls, and between the third pair of the rolls and the fourth pair of the rolls.

The chemical contact means 15 includes a first chemical vessel 15a and a second chemical vessel 15b where the chemical is injected. The vessels are provided at two places (plurality of places), below the lower roll 14a of the first pair of the rolls and below the lower roll 14e of the third pair of the rolls, respectively. Then, a lower portion of the lower roll 14a and a lower portion of the lower roll 14e are arranged being respectively dipped in a first chemical vessel 15a and a second chemical vessel 15b. Accordingly, if the hollow fiber film precursor 30 travels through each of the chemical vessels 15a and 15b, the chemical comes into contact with the hollow fiber film precursor 30 to be picked up, as a result thereof.

In FIG. 2, in order to make positional relationships in the pipe 12a and the branch portion 12b thereof, the introduction roll 13 and the traveling rolls 14a to 14h, and the chemical vessels 15a and 15b be easily understood, other illustrations other than these are omitted.

Each of the chemical vessels 15a and 15b are a so-called cascade type. An inside of the vessel is divided into a plurality of zones (not illustrated) by at least one erected plate along the axial direction of the lower rolls 14a and 14b. The chemical overflowing from the zone on the front side in the drawing is set to be sequentially supplied to the zone on the rear side in the drawing. The details will be described below. However, in this example, the zone on the front side in the drawing corresponds to the upstream side of the traveling hollow fiber film precursor 30, and the zone on the rear side in the drawing corresponds to the downstream side of the traveling hollow fiber film precursor 30. In addition, the number of the zones in the first chemical vessel 15a is set to be $k_1$, and the number of the zones in the second chemical vessel 15b is set to be $k_2$ (both $k_1$ and $k_2$ are integers of 2 or larger).

In addition, in each of the chemical vessels 15a and 15b, the chemical is respectively and consecutively supplied from chemical supply sources 15c and 15d which are disposed outside the decomposition container 11 into the zone on the uppermost upstream side. In each of the chemical vessels 15a and 15b, the chemical is respectively and consecutively discharged from the zone on the lowermost downstream side.

Discharged liquids from the chemical vessels 15a and 15b flow through the bottom portion of the decomposition container 11 and discharge from the drains 18a and 18b along with the condensate of the saturated vapor.

The reference numeral 20 in the drawing indicates a partition plate standing on the bottom portion of the decomposition container 11. By means of this partition plate 20 being provided, the chemical from the first chemical vessel 15a can be discharged from the drain 18a, and the chemical from the second chemical vessel 15b can be discharged from the drain 18b.

During the decomposition step using the decomposition device 10 in FIG. 1, firstly, the high-temperature and normal-pressure saturated vapor is consecutively supplied into the decomposition container 11 by the vapor supply means 12 to fill the inside of the decomposition container 11 with the saturated vapor, thereby performing the heating. Here, the temperature inside the decomposition container 11 is ideally a temperature of the saturated vapor under the normal pressure, approximately at 100° C. However, the temperature may be lower than that. Meanwhile, the chemical is supplied from the chemical supply sources 15c and 15d to each of the chemical vessels 15a and 15b arranged inside the decomposition container 11 using supply pumps 19a and 19b. Here, heaters (not illustrated) may be provided between the supply pump 19a and the first chemical vessel 15a and between the supply pump 19b and the first chemical vessel 15b outside the decomposition container 11, thereby heating the chemical outside the decomposition container 11 to supply the chemical to each of the chemical vessels 15a and 15b.

Subsequently, when the chemical inside each of the chemical vessels 15a and 15b is at the normal temperature, the hollow fiber film precursor 30 which has passed through the water sealing portion 16 is introduced into the decomposition container 11 using the introduction roll 13. It is preferable that a traveling speed of the hollow fiber film precursor 30 inside the decomposition container 11 be, for example, 4 m/min to 50 m/min.

Figure 3:
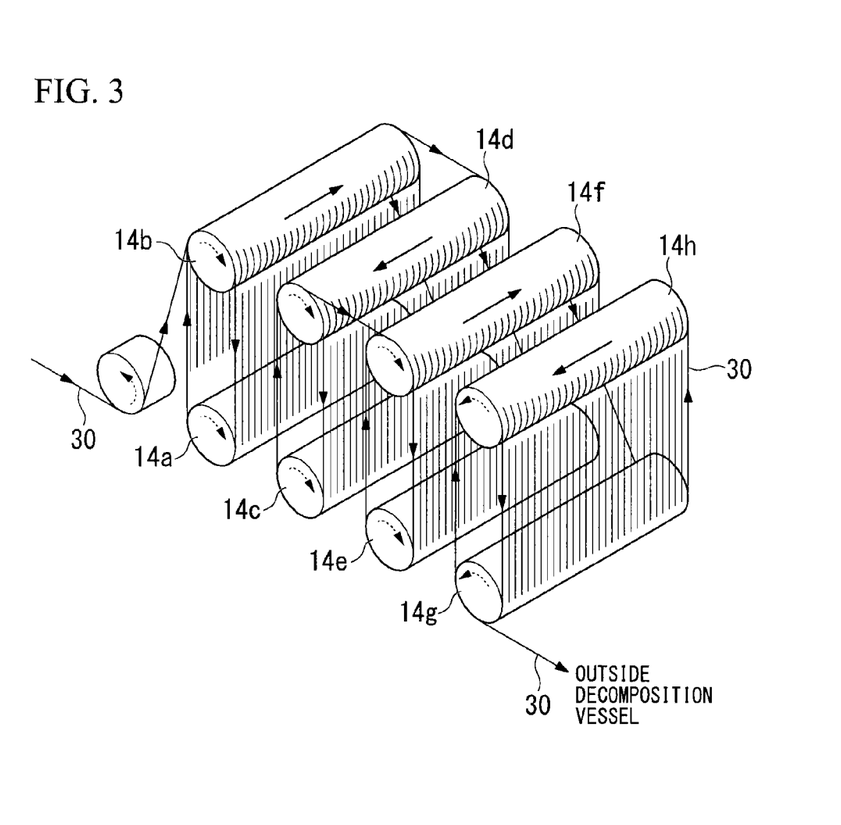
FIG. 3 is a perspective view describing a traveling passage of hollow fiber film precursor in the decomposition device in FIG. 1.

The hollow fiber film precursor 30 introduced into the decomposition container 11 is heated by the saturated vapor which fills inside the decomposition container 11. Then, as illustrated in FIG. 3, in the first pair of the rolls, the hollow fiber film precursor 30 is wound with respect to the upper roll 14b and the lower roll 14a thereof for the plurality of times ($k_1$ times) from the front side in FIG. 3 to the rear side in FIG. 3, and proceeds to the upper roll 14d of the second pair of the rolls.

Here, since the first chemical vessel (not illustrated in FIG. 3) is arranged in the lower roll 14a of the first pair of the rolls, every time the hollow fiber film precursor 30 passes through the lower roll 14a of the first pair of the rolls for the plurality of times ($k_1$ times), the chemical heated by the saturated vapor adheres to the hollow fiber film precursor 30, thereby infiltrating thereof. In addition, in this example, both the number of being in contact with the chemical by the hollow fiber film precursor 30 and the number of zones divided by the erected plate (not illustrated) in the first chemical vessel are set to be the same, $k_1$ times. Therefore, the hollow fiber film precursor 30 comes into contact with the chemical in the zone on the uppermost upstream side among the first chemical vessels when passing through the lower roll 14a of the first pair of the rolls for the first time, and comes into contact with the chemical in the zone on the second most upstream side among the first chemical vessels when passing therethrough for the second time. In this manner, the hollow fiber film precursor 30 comes into contact with the chemical in the zone on the further downstream side every time passing through the lower roll 14a. In FIG. 3, the solid-lined arrow describes the traveling passage of the hollow fiber film precursor 30, and the dotted-lined arrow indicates a rotational direction of each roll.

Then, as described above, the first chemical vessel in this example is the cascade type, and the chemical overflowing from the zone on the upstream side is set to be sequentially supplied to the zone on the downstream side.

In the zone on the further upstream side, the hollow fiber film precursor 30 in which a greater amount of the hydrophilic polymer remains comes into contact with the chemical. In this case, a portion of the hydrophilic polymer is transferred from the hollow fiber film precursor 30 into the chemical within the zone, and thus the decomposition of the transferred hydrophilic polymer proceeds in the chemical of the zone. As a result, the oxidizing agent of the chemical in the zone is consumed for decomposing the transferred hydrophilic polymer, thereby lowering the concentration thereof. Then, in the cascade-type first chemical vessel, such a chemical with the lowered concentration of the oxidizing agent is supplied to the zone on the further downstream side therefrom.

In this manner, in the first chemical vessel, when the chemical is set to come into contact with the hollow fiber film precursor 30 for $k_1$ times, throughout the steps from the first contact to the $k_1$-th contact, the concentration of the oxidizing agent in the chemical in use is gradually lowered.

Since a portion of the hydrophilic polymer in the hollow fiber film precursor 30 that comes into contact with the chemical in the zone on the downstream side is already decomposed on the upstream side, a remaining amount of the hydrophilic polymer is small so that there is no need for the chemical containing high-concentrated oxidizing agent to be used.

Therefore, in this manner, the cascade-type first chemical vessel is employed, and throughout the steps from the first contact to the $k_1$-th contact, the concentration of the oxidizing agent in the chemical in use is gradually lowered, and thus, the oxidizing agent can be used without waste and the amount to be used is reduced.

The state of being "throughout the steps from the first contact to the $k_1$-th contact, the concentration of the oxidizing agent in the chemical in use is gradually lowered" includes a state where the concentration of the oxidizing agent is consecutively lowered as moving toward the zone on the downstream side and a state of being lowered in phase as well. The state of being lowered in phase denotes a state where across a plurality of zones in some out of all the zones, the concentration of the oxidizing agent is constant without being lowered, for example.

In addition, in this example, the number of zones in the first chemical vessel is set to be $k_1$, the same number of being in contact with the chemical in the first chemical vessel by the hollow fiber film precursor 30, thereby exhibiting an aspect of one contact each in a zone. However, the number of the zones in the first chemical vessel may be set to be less than $k_1$ thereby exhibiting an aspect in which the hollow fiber film precursor 30 comes into contact with the chemical in one zone for the plurality of times.

In addition, the cascade-type chemical vessel is exemplified herein to describe such a state of lowering the concentration of the oxidizing agent. However, as long as the concentration of the oxidizing agent can be lowered, the example is not limited to the state of employing the cascade-type chemical vessel.

In such a case where the chemical is brought into contact with the hollow fiber film precursor for the plurality of times, it is preferable that the chemical to be used be an aqueous solution containing the sodium hypochlorite as an oxidizing agent, and the concentration of the sodium hypochlorite in the chemical used for at least the first contact be from 2,000 mg/L to 120,000 mg/L.

In addition, in the hollow fiber film precursor 30 introduced into the decomposition container 11 by the introduction roll 13, the condensate is generated on the surface thereof when heated by the saturated vapor filling the inside of the decomposition container 11 as described above. Therefore, it is preferable that blowing means (not illustrated) for blowing a fluid (gas) such as vapor with respect to the hollow fiber film precursor 30 before being in contact with the chemical be provided in the decomposition container 11 to remove the condensate by the fluid (gas). As another method of removing the condensate, for example, a removal roll (not illustrated) may be provided separately between the introduction roll 13 and the upper roll 14b so that the condensate can be removed by a centrifugal force generated when the hollow fiber film precursor passes over the surface of this removal roll. Otherwise, in a case where the condensate is automatically removed from the hollow fiber film precursor 30 before being in contact with the chemical by the centrifugal force generated when the hollow fiber film precursor 30 passes over the introduction roll 13 or the upper roll 14b, there is no need for the blowing means or the removal roll to be provided deliberately.

A material for the decomposition container 11, the rolls 14a to 14h, the first and second chemical vessels 15a and 15b, the drains 18a and 18b, and the vapor supply means 12 is not particularly limited as long as the material has an anti-oxidizing agent property and a heat-resisting property. For example, titanium, polytetrafluoroethylene, PEEK, ceramic and the like can be exemplified. In addition, as a special form of the material, the above-exemplified material can be used for lining of an inner surface with respect to the decomposition container 11, and for coating of an outer surface with respect to the rolls 14a to 14h, and the like for example, when the material is stainless steel or aluminum having a poor anti-oxidation material property.

Figure 4:
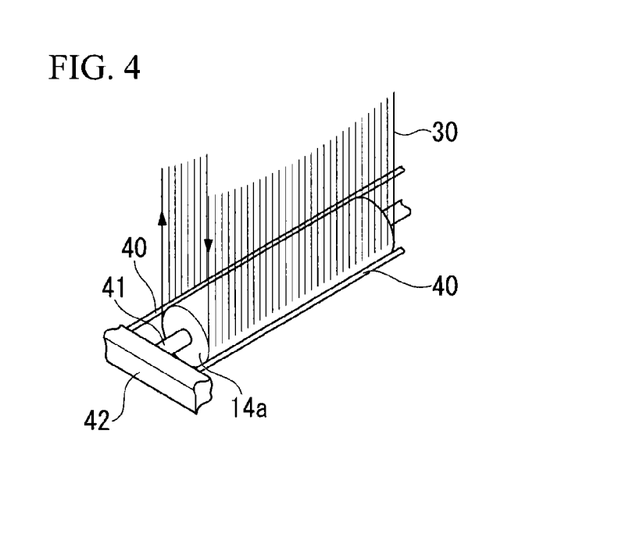
FIG. 4 is a perspective view illustrating an example of a traveling roll to which a guide bar is attached.

The traveling rolls 14a to 14h may have a smooth surface. However, in a case of the smooth surface, a yarn guide where the hollow fiber film precursor 30 travels slips off to be distorted on the surface of the roll, thereby causing a possibility of a tangle of the hollow fiber film precursor 30. For this reason, it is preferable that a regulation groove regulating the traveling of the hollow fiber film precursor be formed on the surfaces of these traveling rolls 14a to 14h. In addition, as illustrated in FIG. 4, in the vicinity of the surface of the traveling roll 14a, two guide bars 40 and 40 disposed along the axial direction thereof may be attached to positions which interpose the traveling roll 14a therebetween facing each other, thereby preventing the hollow fiber film precursor 30 from being distorted and slipping off from the traveling roll 14a to be in a tangle. In the drawing, the reference numeral 41 indicates an axis of the traveling roll 14a and the reference numeral 42 indicates a fixing portion to which the axis 41 is fixed. In this example, the guide bars 40 and 40 are fixed to the fixing portion 42.

In FIG. 4, a state where the guide bars 40 and 40 are attached to the traveling roll 14a is exemplified. However, as needed, it is possible to provide the guide bar in at least any one of the traveling rolls 14a to 14h. In addition, as needed, it is also possible to provide the regulation groove in at least any one of the traveling rolls 14a to 14h. The guide bar and the regulation groove may be used in combination with respect to one traveling roll.

In addition, in a case where the insides of the chemical vessels 15a and 15b are divided into the plurality of zones by the erected plate, on the surface of the traveling rolls 14a and 14e installed corresponding to the chemical vessels 15a and 15b, it is preferable that a groove be formed at a position corresponding to the erected plate so as to prevent the surface and the erected plate from being in contact with each other. In addition, it is more preferable that each of the traveling rolls 14a and 14e be configured to be an independent roll corresponding to each of the zone of the chemical vessels 15a and 15b.

Subsequently, the hollow fiber film precursor 30 is wound around the upper roll 14d and the lower roll 14c for the plurality of times in the second pair of the rolls and on the contrary to the case of the first pair of the rolls, proceeds from the rear side in the drawing to the front side in the drawing. Thereafter, the hollow fiber film precursor 30 proceeds to the upper roll 14f of the third pair of the rolls.

In the third pair of the rolls, similar to the case of the first pair of the rolls, the hollow fiber film precursor 30 is wound around the upper roll 14f and the lower roll 14e for the plurality of times ($k_2$ times) from the front side in the drawing to the rear side in the drawing to be proceeded.

Here, since the second chemical vessel (not illustrated) is arranged for the lower roll 14e of the third pair of the rolls in FIG. 3, the chemical heated by the saturated vapor comes into contact with the hollow fiber film precursor 30 every time the hollow fiber film precursor 30 passes through the lower roll 14e of the third pair of the rolls, thereby infiltrating the hollow fiber film precursor 30. Then, the second chemical vessel also is divided into the zones of $k_2$ by the erected plate (not illustrated), with the same number of being in contact with the chemical in the second chemical vessel by the hollow fiber film precursor 30 that is wound around the lower roll 14e. In addition, the second chemical vessel is the cascade type in which the chemical with low-concentrated oxidizing agent is sequentially supplied from the zone on the upstream side to the zone on the downstream side inside the vessel. Then, when passing through the lower roll 14e of the third pair of the rolls for the first time, the hollow fiber film precursor 30 comes into contact with the chemical in the zone on the uppermost upstream side among the zones of in the second chemical vessel. When passing therethrough for the second time, the hollow fiber film precursor 30 comes into contact with the chemical in the zone on the second most upstream side among the zones of in the second chemical vessel. In this manner, in the second chemical vessel as well, the hollow fiber film precursor 30 comes into contact with the chemical in the zone on the further downstream side every time it passes through the lower roll 14e.

Therefore, in the second chemical vessel as well, when the chemical is set to come into contact with the hollow fiber film precursor 30 for $k_2$ times, throughout the steps from the first contact to the $k_2$-th contact, the concentration of the oxidizing agent in the chemical in use is gradually lowered.

The second chemical vessel can employ the same aspect as the first chemical vessel.

In addition, in each of the first chemical vessel and the second chemical vessel, in a case where the concentration of the oxidizing agent in the chemical is lowered from the upstream side to the downstream side, the chemical in the second chemical vessel for the first contact may be set or is not set to be lower in the concentration of the oxidizing agent than the chemical in the first chemical vessel for the $k_1$-th contact. In other words, in the number of all contacts $k$ ($=k_1+k_2$) with respect to the chemical, throughout the steps from the first contact to the k-th contact, the concentration of the oxidizing agent in the chemical in use is not necessarily lowered gradually.

Subsequently, the hollow fiber film precursor 30 proceeds from the upper roll 14f of the third pair of the rolls to the lower roll 14g of the fourth pair of the rolls, is wound around the upper roll 14h and the lower roll 14g thereof for the plurality of times in the fourth pair of the rolls, and proceeds from the rear side in the drawing to the front side in the drawing. Thereafter, the hollow fiber film precursor 30 is derived outside the decomposition container 11 via the lower roll 14g of the fourth pair of the rolls.

In this manner, inside the decomposition container 11, the hollow fiber film precursor 30 is heated first by the saturated vapor. Thereafter, the chemical heated in the first chemical vessel 15a comes into contact with the heated hollow fiber film precursor 30. The chemical in contact with the hollow fiber film precursor 30 promptly infiltrates the hollow fiber film precursor 30. In addition, since the hollow fiber film precursor 30 in contact with the chemical to be infiltrated is warmed by the saturated vapor as traveling inside the decomposition container 11, the decomposition of the hydrophilic polymer by the chemical which is in contact therewith to be infiltrated starts and proceeds at substantially the same time with the infiltration of the chemical.

In the first pair of the rolls, such contact and infiltration of the chemical is alternately repeated along with the decomposition of the hydrophilic polymer for a plurality of times. In the second pair of the rolls, the hollow fiber film precursor 30 is warmed and the decomposition of the hydrophilic polymer proceeds. Subsequently, in the third pair of the rolls, similar to the case of the first pair of the rolls, the contact and the infiltration of the chemical is alternately repeated along with the decomposition of the hydrophilic polymer for the plurality of times. In the fourth pair of the rolls, the hollow fiber film precursor 30 is warmed and the decomposition of the hydrophilic polymer proceeds.

A length of stay for the hollow fiber film precursor 30 in the first chemical vessel 15a and the second chemical vessel 15b is not particularly limited. However, the length of stay is set to acquire a state where the chemical is sufficiently in contact with the hollow fiber film precursor 30 and the hollow fiber film precursor 30 positioned on the first pair of the rolls and the third pair of the rolls constantly holds the chemical.

In addition, a concentration gradient or a flowing amount of the oxidizing agent inside the cascade-type first and second chemical vessels 15a and 15b may be appropriately set from the viewpoint of a remaining state of the hydrophilic polymer in the hollow fiber film precursor 30 and use efficiency of the oxidizing agent, without being particularly limited.

As described above, according to the decomposition step adopting such a decomposition device 10, since the heated chemical is brought into contact with the hollow fiber film precursor 30 to be adhered, the infiltration of the chemical with respect to the hollow fiber film precursor 30 and the decomposition of the hydrophilic polymer by the oxidizing agent contained in the chemical can proceed at approximately the same time. As a result, it is possible to decompose the hydrophilic polymer in a short time.

In addition, since the decomposition device 10 in this example has the decomposition container 11, the heating means of heating the inside of the decomposition container 11, the traveling means of causing the hollow fiber film precursor 30 to travel through the decomposition container 11, and the chemical contact means 15 of bringing the chemical into contact with the traveling hollow fiber film precursor 30 traveling through the decomposition container 11, it is possible to perform heating the chemical, bringing the heated chemical into contact with the hollow fiber film precursor 30, and warming and decomposing the hydrophilic polymer contained in the hollow fiber film precursor 30 inside the decomposition container 11, and thus, a size of equipment that carries out the decomposition steps is reduced and space saving of the equipment installation can be realized. If the contact of the chemical and the warming of the hollow fiber film precursor are configured to be individually performed in separate containers instead of in one decomposition container, the equipment increases in size.

In addition, in this decomposition device 10, inside one decomposition container 11, since the chemical is not only heated but also the hollow fiber film precursor 30 before being in contact with the chemical can be heated in advance and the hollow fiber film precursor 30 after contact with the chemical can be warmed at a high temperature, the infiltration speed of the chemical with respect to the hollow fiber film precursor 30 can be further improved and the decomposition speed of the hydrophilic polymer remaining in the hollow fiber film precursor 30 can be further increased. If the contact of the chemical and the warming of the hollow fiber film precursor are performed in separate containers, there are possibilities that the hollow fiber film precursor is cooled between each of the containers and the decomposition speed of the hydrophilic polymer decreases in size.

Furthermore, in this example, as heating means, since the vapor supply means 12 supplying the high-temperature and normal pressure saturated vapor into the decomposition container 11 is employed, each temperature of vapor phases of the chemical, the hollow fiber film precursor 30 after contact with chemical and the inside of the decomposition container 11 can be easily maintained at the same temperature based on the temperature of the saturated vapor, thereby being excellent in heating efficiency. The heating means is not limited to the vapor supply means 12 as long as being able to heat the inside of the decomposition container 11. However, the vapor supply means 12 is preferable from a point in that the hollow fiber film precursor 30 can be prevented from drying and the hydrophilic polymer can be effectively decomposed by filling the inside of the decomposition container 11 with the normal-pressure saturated vapor.

In addition, as the chemical contact means 15, since the first chemical vessel 15a and the second chemical vessel 15b are installed, and each of the contact of the chemical with respect to the hollow fiber film precursor 30 and the warming of the hollow fiber film precursor 30 after contact with the chemical are alternately repeated for the plurality of times by causing the hollow fiber film precursor 30 to travel through the inside of each of the chemical vessels 15a and 15b for the plurality of times, it is possible to cause the chemical to additionally adhere to the hollow fiber film precursor 30 again before the oxidizing agent in the chemical which comes into contact with the hollow fiber film precursor 30 to be adhered is totally consumed due to the decomposition of the hydrophilic polymer, thereby efficiently performing the decomposition.

As the chemical contact means, spraying means of spraying the chemical on the hollow fiber film precursor 30 which travels inside the decomposition container 11 may be employed to spray the chemical on the hollow fiber film precursor 30 which travels inside the decomposition container 11 to be adhered. As the spray means, a spray portion which is connected to the chemical supply sources 15c and 15d through the pipes and sprays the chemical from the chemical supply sources 15c and 15d may be provided to be employed.

In addition, among the pipes connecting the chemical contact means such as the spray means provided with such a spray portion and the chemical supply sources 15c and 15d, a heat exchange portion (not illustrated) in which the chemical is heated by heat exchange between the chemical and the gas inside the decomposition container 11 may be provided on at least a portion of the parts introduced into the decomposition container 11. Particularly, it is suitable to configure the heat exchange portion using coil tubing with a large surface area (heat transfer area) formed of polytetrafluoroethylene and the like, for example. Accordingly, before the chemical from the chemical supply sources 15c and 15d is sprayed on the hollow fiber film precursor 30, the hollow fiber film precursor 30 flows inside the coil tubing with the large surface area, thereby being efficiently heated. The heat exchange portion may be a plate type, a multi-tube type and the like in addition to the coil tube type configured to have the coil tube.

As the chemical contact means, different forms of means may be used in combination. The spray means may be employed at a certain place inside the decomposition container, and the chemical vessel may be employed at another place.

In addition, the spray means is installed at multiple places on the traveling passage of the hollow fiber film precursor, and thus, it is possible that the contact of the chemical with respect to the hollow fiber film precursor and the warming of the hollow fiber film precursor after being contact with the chemical be alternately repeated for the plurality of times.

There is no particular limitation on the installation place for the spray means. However, it is preferable that the spray means be installed at a position where the chemical is sprayed on the hollow fiber film precursor 30 passing over the upper roll 14b. Accordingly, a great portion of the sprayed chemical comes into contact with the hollow fiber film precursor 30, and thus, it is possible to perform the efficient contact without wasting the chemical.

In addition, in order to more efficiently bring the chemical into contact with the hollow fiber film precursor 30, a method of dripping the chemical onto the hollow fiber film precursor 30 can be employed.

In addition, in the chemical contact means, it is possible to employ a form in which guide-type chemical applying means including a passing channel through which the hollow fiber film precursor passes and a chemical supply channel provided at an angle (for example, 90 degrees) intersecting a passing direction of the hollow fiber film precursor, thereby causing the chemical to adhere to the circumferential surface side of the hollow fiber film precursor passing through the passing channel. As such a chemical apply means, for example, Oiling Guide (produced by Yuasa Yarn Guide Co., Ltd.) and the like which is commercially available can be diverted.

As a shape of the decomposition container 11, the illustrated example shows a shape of which the top portion (ceiling) that closes the upper ends of the side wall portions is flat. However, it is also preferable that the top portion have an apex portion and a slope portion which slopes downward from the apex portion. With the top portion in such a shape, the condensate of vapor which adheres to the top portion is prevented from flowing down the side wall portion via the slope portion and dripping on the chemical within the chemical vessels 15a and 15b or the hollow fiber film precursor 30. Therefore, it is possible to prevent dilution of the chemical due to the condensate and a hindrance to the chemical infiltration with respect to the film.

[Washing Step]

After the decomposition step, it is preferable to perform the washing step of dipping the hollow fiber film precursor into a washing liquid to be washed. As the washing liquid used in the washing step, there is no particular limitation as long as the liquid is clear and the decomposition products of the hydrophilic polymer is dispersed or dissolved. However, it is preferable for water to have a high washing effect. As the water to be used, tap water, industrial water, river water, well water and the like can be exemplified, and alcohols, inorganic salts, oxidizing agents, surfactant and the like may be mixed thereto to be used. In addition, as the washing liquid, a liquid mixture of the good solvent of hydrophobic polymer and water can be employed.

In order to suppress viscosity of the solution of the hydrophilic polymer to be low and prevent a spreading diffusion speed from decreasing, it is suitable that a washing temperature be high. It is preferable that the temperature be 50° C. or higher, and more preferable that the temperature be 80° C. or higher. Moreover, if the washing is performed as boiling the washing liquid, since the hydrophilic polymer or a defilement adhere to an outer surface of the hollow fiber film precursor can be scraped off due to bubbling through the boiling, efficient washing can be achieved. A hollow fiber film can be obtained through such a washing step.

[Drying Step]

After the washing step, a drying step of drying the hollow fiber film is performed. The drying step, without being particularly limited, may be performed through a method in which the hollow fiber film is introduced to a drying apparatus such as a hot air dryer.

[Others]

Between the film forming step and the decomposition step, a pre-washing step of dipping and washing the hollow fiber film precursor obtained through the film forming step may be performed. A washing liquid can be selected from the liquids exemplified in the washing step.

In addition, the hollow fiber film is exemplified as a porous film in the above description, and the method of manufacturing and the apparatus for manufacturing thereof are described. However, the porous film is not limited to the hollow fiber film. For example, a flat film, a tubular film and the like can be exemplified.

[Embodiment]

Hereinafter, the present invention will be described in details with reference to an embodiment.

<Embodiment>

[Film Forming Step]

In order to acquire mass ratios indicated in Table 1, polyvinylidene fluoride A (produced by Atofina Japan K.k., Kynar 301F (Product Name)), polyvinylidene fluoride B (produced by Atofina Japan K.k., Kynar 9000LD (Product Name)), polyvinyl pyrrolidone (ISP Co., Ltd./brand name: K-90) and N, N-dimethylacetamide are respectively mixed to prepare an undiluted film forming solution (1) and an undiluted film forming solution (2). Hereinafter, the polyvinylidene fluoride may be referred to as PVDF, and the polyvinyl pyrrolidone may be referred to as PVP.

Subsequently, a nozzle in which a hollow portion is formed in the center and double annular discharge ports are sequentially formed on an outer side thereof so as to be able to sequentially apply two types of liquids is prepared (refer to FIG. 1 in Japanese Unexamined Patent Application, First Publication No. 2005-42074), this is in a state of being warmed at 30° C., and a multi-filament single fiber plaited cord (multi-filament; 420T/180F) made of polyester as a porous base material is introduced into the hollow portion while sequentially coating the undiluted film forming solution (2) and the undiluted film forming solution (1) on an outer periphery thereof from an inner side to be coagulated in the coagulated liquid (liquid mixture of 5 parts by weight of N, N-dimethylacetamide and 95 parts by weight of water) which is warmed at 80° C. In this manner, a hollow fiber film precursor with one partition defined layer in the vicinity of an outer surface while having a plaited cord coated with an inclined structure of a porous layer of which hole diameter increases toward an inner portion is obtained. Between the coated undiluted film forming solutions (1) and (2), the main undiluted solution which forms a film structure of the hollow fiber film is the undiluted film forming solution (1) coated on the outer side.

Moreover a nozzle in which a hollow portion of which an inner diameter is larger than an outer diameter of this hollow fiber film precursor and double annular discharge ports are sequentially formed on an outer side thereof so as to be able to sequentially apply two types of liquids is prepared (refer to FIG. 1 in Japanese Unexamined Patent Application, First Publication No. 2005-42074), this is in a state of being warmed at 30° C., and the hollow fiber film precursor obtained as above is introduced to the hollow portion while sequentially coating glycerin (manufactured by Wako Pure Chemical Industries, Ltd./first class) and the undiluted film forming solution (1) is applied on an outer periphery thereof from an inner side to be coagulated in the coagulated liquid which is warmed at 80° C. equal to the previous one. In this manner, a hollow fiber film precursor with a two-layer structure in which the porous layer is coated and having a plaited cord support body is further obtained.

Moreover, the hollow fiber film precursor is pre-washed for five minutes with water at 100° C.

A spinning speed (traveling speed of hollow fiber film precursor) in this case is set to be 20 m/min.

TABLE 1

| Composition | Undiluted Film Forming Solution (1) | Undiluted Film Forming Solution (2) |
| --- | --- | --- |
| Polyvinylidene Fluoride A | 12 | 3 |
| Polyvinylidene Fluoride B | 8 | 2 |
| Polyvinyl Pyrrolidone | 10 | 2 |
| N,N-dimethylacetamide | 70 | 93 |
| Temperature of Undiluted Solution | 60° C. | 50° C. |
| Concentration of Polyvinylidene Fluoride in Undiluted Solution | 20% | 5% |

[Decomposition Step]

In the decomposition device 10 illustrated in FIG. 1, the hollow fiber film precursor 30 obtained as above is consecutively introduced and the decomposition step is performed as being heated by the normal-pressure saturated vapor. A condition of the decomposition step is as follows.

The traveling speed of the hollow fiber film precursor 30 in the decomposition container 11 is 20 m/min, and it individually takes 66 seconds for the hollow fiber film precursor 30 to pass over each of the pair of the rolls such as the first pair of the rolls, the second pair of the rolls, the third pair of the rolls, and the fourth pair of the rolls. In addition, in each of the first chemical vessel 15a and the second chemical vessel 15b, the hollow fiber film precursor 30 is under a condition to pick up the sodium hypochlorite (oxidizing agent) aqueous solution for ten times.

The sodium hypochlorite aqueous solution respectively supplied to the first chemical vessel 15a and the second chemical vessel 15b is set to be concentration of 120,000 mg/L and have a supply amount of 50 ml/min, and the sodium hypochlorite aqueous solution supplied to each of the vessels 15a and 15b is promptly heated to 100° C.

[Washing Step and Drying Step]

The washable hydrophilic polymer remaining in the hollow fiber film precursor 30 is washed to be removed by the washing step configured to include a decompression step, a washing liquid supply step, and the decompression step which is disclosed in the Embodiment 4 of Japanese Unexamined Patent Application, First Publication No. 2008-161755 and the hollow fiber film is obtained.

Subsequently, the hollow fiber film is introduced to the hot air dryer to be dried.

In the present embodiment, the length of stay of the hollow fiber film in the decomposition container is 270 seconds.

In addition, regarding the hollow fiber film obtained through the embodiment, the concentration of PVP which is the hydrophilic polymer is 1.2% when measured, fulfilling the condition to be 2% or lower in PVP concentration which allows the hollow fiber film to sufficiently exhibit the water permeability in water.

An amount of the hydrophilic polymer remaining in the hollow fiber film can be figured out by obtaining an absorbance spectrum of the hollow fiber film using an infrared spectrophotometer and comparing absorption intensity of the hydrophobic polymer and the absorption intensity of the hydrophilic polymer in these absorbed spectrums. In a case of manufacturing the hollow fiber film using PVDF for the hydrophobic polymer and PVP for the hydrophilic polymer, the absorption intensity by carbonyl group expansion and contraction vibration ($1,700\ cm^{-1}$) of PVP and the absorption intensity by C-H expansion and contraction vibration ($1,400\ cm^{-1}$) of PVDF are calculated. Then, when the absorption intensity by the C-H expansion and contraction vibration of PVDF is referred to as 100%, the absorption intensity by the carbonyl group expansion and contraction vibration of PVP is calculated from comparing these ratios of absorption intensity to see the corresponding percentage thereof, and thus, this value (%) is considered as an amount of the remaining hydrophilic polymer.

COMPARATIVE EXAMPLE

The hollow fiber film precursor is formed by the same film forming step as the embodiment.

Subsequently, the hollow fiber film precursor is dipped into a dipping vessel in which the chemical with concentration of the sodium hypochlorite the same as in the embodiment at 30° C. (not heated) for 80 seconds to bring the chemical into contact with the hollow fiber film precursor, thereby being held. Subsequentially, the hollow fiber film holding the chemical is introduced into the decomposition container to be held at normal-pressure vapor atmosphere for 80 seconds. Thereafter, the same washing step as in the Embodiment 1 is performed.

Furthermore, the hollow fiber film precursor is dipped into the dipping vessel for 80 seconds in the same manner as above, and is maintained in the decomposition container 11 for 80 seconds. Then, a hollow fiber film is obtained by performing the same washing step as in the Embodiment 1. The dipping time in the chemical and the holding time in the decomposition container are 320 seconds in total.

Subsequently, the hollow fiber film is introduced to the hot air dryer to be dried. Regarding the hollow fiber film obtained in this manner, the concentration of PVP is 2.5% when measured in the same manner as in the embodiment, not fulfilling the condition to be 2% or lower which allows the hollow fiber film to sufficiently exhibit the water permeability in film. According to this result, in the method of the comparative example, it is obvious that even if the longer time is taken than in the embodiment, the hydrophilic polymer remaining in the hollow fiber film precursor after the film forming step cannot be sufficiently decomposed. In addition, each of the dipping vessel allowing the hollow fiber film precursor to hold the chemical and the decomposition container to hold the hollow fiber film precursor at high temperature are independent vessels from each other, thereby requiring large space for the installation thereof.

REFERENCE SIGNS LIST 10 decomposition device
11 decomposition container
12 vapor supply means
15 chemical contact means
30 hollow fiber film precursor

The invention claimed is:

1. A method of manufacturing a porous film, the method comprising:
coagulating an undiluted film forming solution comprising a hydrophilic polymer and a hydrophobic polymer, thereby obtaining a porous film precursor;
consecutively introducing the porous film precursor into a decomposition container;
bringing a heated chemical comprising an oxidizing agent into contact with the porous film precursor in the decomposition container, wherein the decomposition container is warmed by a vapor;
warming the porous film precursor in contact with the chemical by traveling the porous film precursor in the vapor phase;
decomposing the hydrophilic polymer remaining inside the porous film precursor in the presence of the oxidizing agent, and
discharging the porous film precursor from the decomposition container.

2. The method of claim 1,
wherein the porous film precursor to be in contact with the chemical is heated in advance.

3. The method of claim 1,
wherein said bringing and said warming are individually performed for a plurality of times.

4. The method of claim 3,
wherein
the chemical is an aqueous solution comprising sodium hypochlorite as the oxidizing agent, and
when said bringing is performed for the plurality of times, a concentration of the sodium hypochlorite in the chemical for the first contact is from 2,000 mg/L to 120,000 mg/L.

5. The method of claim 1,
wherein the vapor phase has a temperature of 60° C. or higher and a relative humidity of 90% or higher inside the decomposition container.

6. The method of claim 1,
wherein vapor is supplied to the decomposition container.

7. The method of claim 1,
wherein said bringing occurs by introducing the porous film precursor into the chemical.

8. The method of claim 1,
wherein said bringing occurs by spraying the chemical on the porous film precursor.

* * * * *